US010541845B2

(12) United States Patent
Stuart

(10) Patent No.: US 10,541,845 B2
(45) Date of Patent: Jan. 21, 2020

(54) PSEUDO RANDOM MULTI-CARRIER METHOD AND SYSTEM

(71) Applicant: Kenneth Stuart, Shetland (GB)

(72) Inventor: Kenneth Stuart, Shetland (GB)

( * ) Notice: Subject to any disclaimer, the term of this patent is extended or adjusted under 35 U.S.C. 154(b) by 0 days.

(21) Appl. No.: 15/714,261

(22) Filed: Sep. 25, 2017

(65) Prior Publication Data
US 2019/0097858 A1   Mar. 28, 2019

(51) Int. Cl.
*H04L 27/26*   (2006.01)
*H04L 5/00*   (2006.01)

(52) U.S. Cl.
CPC ........ *H04L 27/2627* (2013.01); *H04L 5/0048* (2013.01); *H04L 27/261* (2013.01)

(58) Field of Classification Search
None
See application file for complete search history.

(56) References Cited

U.S. PATENT DOCUMENTS

| | | | | |
|---|---|---|---|---|
| 5,442,659 A * | 8/1995 | Bauchot | ............... | H04B 1/7156 375/134 |
| 5,519,692 A * | 5/1996 | Hershey | ................... | H04B 1/69 370/210 |
| 5,784,409 A * | 7/1998 | Coles | .................. | H04L 25/4925 341/56 |
| 6,005,889 A * | 12/1999 | Chung | ............... | H04B 1/70753 375/140 |
| 6,229,796 B1 * | 5/2001 | Dent | ........................ | H04J 13/00 370/335 |
| 6,327,262 B1 * | 12/2001 | Jeong | ................. | H04Q 11/0478 370/395.1 |
| 6,959,030 B1 * | 10/2005 | Clark | .................... | H04J 13/107 370/208 |
| 6,985,548 B1 * | 1/2006 | Jabbar | ................. | H04L 27/2662 375/355 |
| 7,035,408 B2 * | 4/2006 | Antoine | ............. | H04L 27/2613 380/44 |
| 7,194,317 B2 | 3/2007 | Kothare et al. | | |
| 7,509,500 B2 * | 3/2009 | Sarkar | ..................... | G06F 7/588 380/270 |
| 7,515,615 B2 * | 4/2009 | Peeters | ..................... | H04J 1/00 370/515 |

(Continued)

OTHER PUBLICATIONS

Baird et al., Keyless Jam Resistance, Proceedings of the 8th Annual IEEE SMC IAW, Jun. 2007, pp. 143-150 (Cited in the Applicant's IDS filed on Sep. 25, 2017).*

(Continued)

*Primary Examiner* — Berhanu Tadese
(74) *Attorney, Agent, or Firm* — Drinker Biddle & Reath LLP

(57) ABSTRACT

A system and method of multi-carrier communication utilizes a farm of superimposed code and random phase values for generation of carrier signals and is resistant to malicious and non-malicious interference in a wireless network, such as an ad-hoc mobile communication network. The system and method includes an encoding/decoding algorithm and the use of a unique and easily generated pseudo random multi-frequency waveform, has high dynamic range, and is flexibly adaptable for different radio networks. The system and method further includes broadcasting a message with a non-secret checksum that is encoded with a hash function.

12 Claims, 13 Drawing Sheets

Received Data Processing (604)

① The decoded data packet is checked to see if it is valid.
② At the same time the data packet is checked to see if it is a hallucination. If the data packet is a hallucination it is dropped.
③ If the data packet is not a hallucination but does not pass the validity check it can be passed back to the decoder to try again.
④ If the decode is unsuccessful error correction can be preformed.
⑤ The number of iteration through the decoder should be proportional to the processing power of the platform.

(56) References Cited

U.S. PATENT DOCUMENTS

| | | | |
|---|---|---|---|
| 7,649,951 B2 | 1/2010 | Moffatt | |
| 8,325,702 B2* | 12/2012 | Michaels | H04W 72/12 370/347 |
| 9,194,936 B1* | 11/2015 | Keegan | H04L 27/2601 |
| 9,876,664 B2* | 1/2018 | Hwang | H04L 27/2627 |
| 2001/0036274 A1* | 11/2001 | Antoine | H04L 27/2613 380/268 |
| 2002/0172146 A1* | 11/2002 | Wu | H04L 27/2608 370/208 |
| 2002/0197978 A1* | 12/2002 | Zavidniak | H04L 63/1416 455/410 |
| 2004/0042543 A1* | 3/2004 | Li | H04L 25/03159 375/222 |
| 2004/0101142 A1* | 5/2004 | Nasypny | G06F 21/602 380/278 |
| 2004/0213331 A1* | 10/2004 | Peeters | H04J 13/00 375/146 |
| 2005/0041757 A1 | 2/2005 | Rosen | |
| 2005/0058151 A1* | 3/2005 | Yeh | H04W 52/46 370/445 |
| 2005/0242985 A1* | 11/2005 | Ponsford | G01S 7/36 342/59 |
| 2006/0050878 A1* | 3/2006 | Antoine | H04L 27/2613 380/47 |
| 2007/0038743 A1* | 2/2007 | Hellhake | H04L 29/12283 709/224 |
| 2007/0204204 A1* | 8/2007 | Sul | H03M 5/145 714/776 |
| 2008/0095121 A1* | 4/2008 | Shattil | H04J 13/0003 370/335 |
| 2008/0107429 A1* | 5/2008 | Galli | H04B 10/505 398/188 |
| 2008/0144493 A1* | 6/2008 | Yeh | H04W 52/50 370/230 |
| 2010/0058070 A1* | 3/2010 | Garay | H04L 9/0631 713/190 |
| 2010/0180173 A1* | 7/2010 | Batra | H04L 1/1812 714/751 |
| 2010/0283656 A1* | 11/2010 | Zavrel, Jr. | G01S 7/38 342/14 |
| 2011/0002364 A1* | 1/2011 | Michaels | H04B 1/707 375/141 |
| 2011/0241937 A1* | 10/2011 | Choi | G01S 19/29 342/357.69 |
| 2013/0202001 A1* | 8/2013 | Zhang | H04L 29/10 370/476 |
| 2014/0177706 A1* | 6/2014 | Fernandes | H04N 19/463 375/240.03 |
| 2014/0270011 A1* | 9/2014 | Varadarajan | H04L 23/02 375/340 |
| 2014/0294002 A1* | 10/2014 | Kim | H04N 21/236 370/390 |
| 2014/0341103 A1* | 11/2014 | Hwang | H04W 72/005 370/312 |
| 2015/0155981 A1* | 6/2015 | Kim | H04L 5/0007 375/295 |
| 2015/0163017 A1* | 6/2015 | Elam | H04B 7/0854 375/343 |
| 2015/0163083 A1* | 6/2015 | Hwang | H04L 5/0044 375/260 |
| 2015/0349997 A1* | 12/2015 | Baek | H04L 27/2637 375/262 |
| 2016/0092298 A1* | 3/2016 | Grube | G06F 11/10 714/776 |
| 2016/0099796 A1* | 4/2016 | Yang | H03M 13/1177 714/776 |
| 2016/0143000 A1* | 5/2016 | Hwang | H04L 27/2627 375/267 |
| 2016/0381516 A1* | 12/2016 | Kim | H04W 4/06 370/312 |
| 2017/0033959 A1* | 2/2017 | Kim | H04L 1/0041 |
| 2017/0163461 A1* | 6/2017 | Baek | H04L 27/2613 |
| 2017/0243485 A1* | 8/2017 | Rubin | H04W 72/005 |
| 2017/0264424 A1* | 9/2017 | Cassiau | H04L 7/0033 |
| 2017/0272692 A1* | 9/2017 | Lee | H04N 19/187 |
| 2017/0279571 A1* | 9/2017 | Melodia | H04L 27/2602 |
| 2017/0286212 A1* | 10/2017 | Grube | G06F 11/10 |
| 2018/0083751 A1* | 3/2018 | Seo | H04L 27/26 |
| 2019/0097858 A1* | 3/2019 | Stuart | H04L 27/2627 |
| 2019/0140775 A1* | 5/2019 | Yoon | H04W 72/0413 |

OTHER PUBLICATIONS

Proceedings of the 8th Annual IEEE SMC Information Assurance Workshop (IAW), Orlando, Florida, Jun. 20-22, pp. 143-150, *Keyless Jam Resistance*, by Baird III, Bahn, Collins, Carlisle, & Butler (2007).

*Perturbation Signals for System Identification* edited by Keith Godfrey, Ch. 13 (1993).

\* cited by examiner

PSEUDO RANDOM MULTI-CARRIER METHOD AND SYSTEM

TECHNICAL FIELD AND BACKGROUND

The present disclosure relates generally to the field of communications, and more specifically to a radio frequency multi-carrier communication system and method that utilizes a form of superimposed code and random phase values for generation of carrier signals that is resistant to malicious and non-malicious interference.

SUMMARY

A system and method of multi-carrier communication utilizes random phase values for generation of carrier signals and is resistant to malicious and non-malicious interference in a wireless network. Embodiments of the new communication system and method are herein referred to as pseudo random multi-carrier communication. The pseudo random multi-carrier communication system and method is resistant to malicious and non-malicious interference in a wireless network, such as an ad-hoc peer-to-peer multi-hopping mobile wireless communication network, and uses pseudo random distribution of energy in the frequency domain and a plurality of radio frequencies carriers.

Embodiments of the disclosure implement a wideband simultaneous frequency-hopping system and method for jam-resistant wireless communication without a shared secret. Further embodiments of the disclosure use a pseudo-random multi-frequency waveform modelled from a pseudo-random Gaussian noise perturbation signal where information is encoded into the multi-carrier waveform using superimposed codes, such as concurrent codes. The encoded waveform is transmitted at different frequencies simultaneously.

The spacing and number of carriers, or spectral lines, used in the waveform can be chosen based on the radio frequency (RF) hardware used in the communication system and can be chosen on the fly. The decisions made at generation time account for the data rate required, the type of communication channel, and the power available in the system. Furthermore, because a property of the PRMC signal is such that it is a periodic inverse repeat waveform, processing gain can be achieved at the receiver relatively easily compared to orthogonal frequency-division multiplexing (OFDM), for example. The properties of embodiments of disclosure that utilize the BBC encoding algorithm, for example, reduce the burden on processing in the transmitter and receiver and the requirements for standard techniques like channel estimation and equalization, which can be exploited by a malicious transmitter.

Aspects of the disclosure include a processing system or method for wireless transmission that formats blocks of superimposed code; generates a multi-carrier waveform signal derived from a pseudorandom binary signal having a plurality of symbol bins with information components and a zero components; encoding the information components by setting a magnitude value and a phase value that is randomly generated; and transmitting the encoded multi-carrier waveform signal at different frequencies simultaneously.

Another aspect of the disclosure include a processing system or method for wireless reception that receives an encoded multi-carrier waveform signal derived from a pseudorandom binary signal having a plurality of symbol bins with information components and a zero components that have a magnitude value and a random phase value; decoding the encoded multi-carrier waveform signal; and formatting a block of superimposed code corresponding to the information components of the symbol bins.

A yet another aspect of the disclosure include a processing system or method of wireless communication that formats a block of superimposed code; generates a multi-carrier waveform signal derived from a pseudorandom binary signal having a plurality of symbol bins with information components and zero components; encoding the information components by setting a magnitude value and phase value that is randomly generated; wirelessly transmitting and receiving the encoded multi-carrier waveform signal at different frequencies simultaneously; decoding the encoded multi-carrier waveform signal; and formatting a block of superimposed code corresponding to the information components of the plurality of symbol bins.

DRAWINGS

The accompanying figures, which are incorporated herein and form a part of the specification, illustrate various exemplary embodiments of the disclosure and, together with the description, further serve to explain various principles and to enable a person skilled in the pertinent art to make and use the disclosure.

DESCRIPTION

Figure 1:
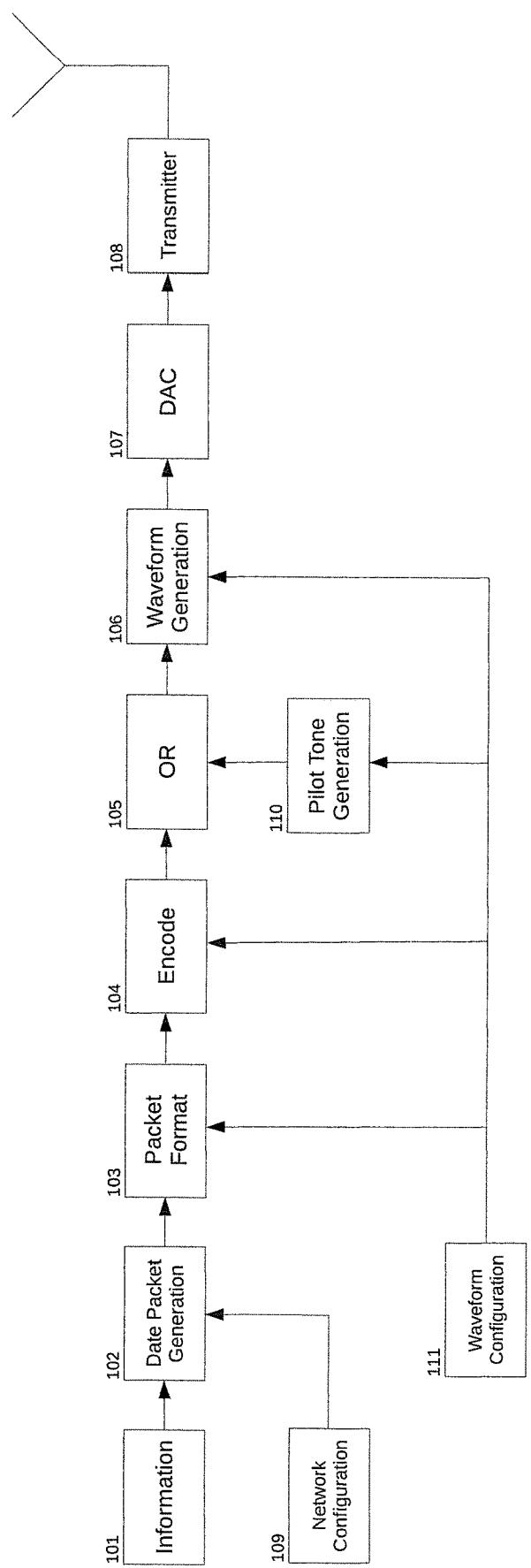
FIG. 1 is a block diagram of the transmitter portion of the pseudo random multi-carrier system and method.

Jam resistance has become increasingly important to modern wireless communication. In particular, the growing use of ad-hoc networks raises significant issues in how those networks are protected against jamming and other malicious attacks. Traditionally, radio communication has been made resistant to jamming by the use of a secret key that is shared by the sender and receiver. For example, jam resistance has been achieved through spread spectrum communication where the sender and receiver share a secret key. Spread spectrum techniques have been in use since the 1940s and can be based on direct sequence, frequency hopping, or pulse-based approaches.

In direct sequence systems (DSSS), for example, a sender uses all frequencies simultaneously, by combining the message with a pseudo random bit stream, generated according to some key or seed. If the key is known, then an attacker can predict the sequence and can broadcast a signal using that sequence and to mask a signal sent by a legitimate user. If the key is secret, the attacker is forced to expend far more energy than the legitimate sender in its attempts to mask the signal sent by a legitimate user.

In spread spectrum systems, for example, it is possible for multiple users to transmit without jamming each other, so long as each user uses a different channel (e.g., a different seed for the pseudorandom generator). However, an attacker can easily jam the system if the channel is known. Thus, jam resistance is only possible by using a secret key to control the sequence of frequencies (or chip sequence) or the timing of the pulses. If the secret is known, then an attacker can concentrate energy in the channel being used (defined by the key), and easily jam the communication with little energy expenditure.

The use of secret keys, however, is demanding on the communication infrastructure supporting the communication devices used and there is no way to use a secret key to protect a signal that is meant to be public. Thus, the problem of keyless jam resistance is important, and there needs to be a way that strangers with no shared secret between them can exchange messages over a wireless medium in a way that an attacker cannot easily interfere or prevent those messages from arriving. Depending on the type of communication system, this could be all data transmitted and received or limited to the link set up, for example, key exchange or configuration data.

For large scale applications, for example GPS where the intended audience is not limited and includes potential attackers, there needs to be a way to protect the GPS signals that are meant to be public. Even in private networks, using a shared secret is problematic when an attacker is able to physically capture one of the network or communication devices.

To address these problems, systems and methods for omnidirectional jam-resistant wireless communication without a shared secret have been described. One such system is the Baird, Balm, and Collins ("BBC") system and method, as described in *Proceedings of the 8th Annual IEEE SMC Information Assurance Workshop (IAW)*, Orlando, Florida, Jun. 20-22, pgs. 143-50, *Keyless Jam Resistance*, by Baird III, Balm, Collins, Carlisle, & Butler (2007), which is hereby incorporated herein by reference in its entirety.

The BBC system and method works by defining code words that can be combined with a bitwise OR operation, and then reliably and efficiently decoded. The system is built on an OR channel which is a way of communicating bits where it is easy for an attacker to change a "0" to a "1", but difficult to change a "1" to a "0". The BBC system and method is based on coding theory using codes derived from arbitrary hash functions, where the hash output is employed to achieve jam resistant transmission of RF power at specific frequencies. The RF power at each frequency is representative of a mark in the frequency domain in a complete communication system as hereinafter described.

More particularly, the additive-OR channel possesses a specific property that any signal that is added to a channel on top of those already there only has the ability to add marks and never to remove them (i.e., change a "0" to a "1", but not a "1" to a "0"). Such a property is unlike other modern communication systems, which generally experience an error that turns a "1" into a "0" the as often as an error that turns a "0" into a "1".

Specifically, the BBC encoding scheme is based on a special form of superimposed codes developed for the purpose of BBC that is referred to in the field of coding as concurrent codes. The main feature of the concurrent codes are seen in the ability to receive multiple messages concurrently, where the output is a list of all data packets whether they originate from a legitimate sender or not in an efficient way. This means that when several code words are OR'd together, and several of the "0" bits are changed to "1" bits, the result of decoding will contain all the original code words that were combined, plus a small number of additional, spurious, code words, which can be filtered out using standard techniques such as checksums, hashes, or other known techniques.

Concurrent code systems can operate with little degradation if a large number of "0's" are turned in to "1's" (known as space errors), but not when a "1" is erroneously turned into a "0" (known as mark errors). Thus, the type of channel that is needed for concurrent coding is a highly asymmetric one in which space error rates approaching, for example, 50% can be tolerated, but in which mark error rates should be driven to near zero. An additive-OR channel has the kind of error asymmetry that is needed because in this type of channel signals are combined using a logical ORing of all the signals in the channel. The receiver detects a mark if any station, either friend or foe, is transmitting a mark while it detects a space only if no station, neither friend nor foe, is transmitting a mark.

It should be noted that modifications to the BBC algorithm permit space error rates well above 50% to be tolerable and other modifications permit non-zero mark error rates to be tolerated. Thus, a perfect additive-OR channel is not required, but rather a reasonable approximation of one. For example, an additive-OR channel may use On-Off Keying (OOK) modulation in which a noisy burst of energy with as much peak power as possible is used to transmit a mark and the transmitter is squelched altogether when transmitting a space. Because BBC codewords are extremely sparse, perhaps one mark per thousand or more spaces, the average transmitted power will be very small. Thus, a transmitter could dump hundreds of watts of power into each mark while consuming less than a single watt on average. The receiver's detection threshold will be set low enough so that the output of the receiver is about one-tenth to one-third marks, which will result in the mark error rate nearly as low as it can get without exceeding the acceptable space error rate.

The BBC algorithm sends a message by first encoding it as a packet, which is a long sequence of mostly "0" bits with a few "1" bits in it. It is designed to be easy for the receiver to recover the message from the received packet, even if an attacker has added a number of "1" bits. As noted, generally it only fails if the attacker can fill a significant portion (e.g., 30-50%) of this packet with "1" bits. For example, if the sender is filling only one position out of 3000 with a "1" bit, then the attacker would need to fill one of every three, which would require 1000 times the broadcast energy. This property accounts for the system's resistance to jamming.

The BBC algorithm has been described for each major spread spectrum technique (e.g., pulse, frequency-hopping-simultaneous, frequency-hopping-sequential, and direct-sequence). For BBC frequency-hopping-simultaneous, for example, a "location" is the frequency of a signal and a "mark" is the pure sinusoidal signal broadcast on the appropriate frequency, where all marks are sent simultaneously. The frequency-hopping approach has the property of sending information holographically.

Turning to another field that is relevant to the disclosure, academic literature describes system identification, and particularly perturbation signal design and application for system identification, both in the time domain and in the frequency domain. By way of background, when measuring the dynamics of a system, a perturbation signal may be applied at the input to measure the response of the system to the signal. The input and output signals may then be processed to estimate the dynamics of the system. This procedure is known as system identification. *Perturbation Signals for System Identification* edited by Keith Godfrey (1993) describes perturbation signals design options and in hereby incorporated herein by reference in its entirety.

Multi-frequency signals for plant identification, and pseudo-random Gaussian noise signals in particular, are useful and reduce computational overhead. See *Perturbation Signals for System Identification* edited by Godfrey, Ch. 13. These signals have an approximately random Gaussian probability density function and can result in system response signals of lower amplitude compared with other designs as the system bandwidth is reduced. Specifically, a pseudo-random perturbation signal which is based on properties of the Gaussian model is known by performing an inverse fast Fourier transform (FFT) on suitably chosen magnitude and phase elements A(k) and φ(k), respectively:

$$x(i) = \sum_{k=0}^{N-1} A(k) e^{j[k(2\pi/N)+\phi(k)]} \quad i \in 0, N-1$$

This procedure results in a multi-frequency signal with a desired harmonic content. If all phases were made zero then the resulting signal would peak at index i=0, resulting in a large relative peak factor value. This effect can be reduced by adjusting the phases of individual harmonies using a suitable phase-encoding algorithm.

The method used to synthesize pseudo-random Gaussian noise (PRGN) attempts to simulate the magnitude and phase probability distribution of a band-limited Gaussian signal. Magnitude values are adjusted to provide a spectral envelope as required by the intended application of the signal. Phase values are independently assigned in pseudo-random order such that their distribution is uniform over the interval of 2π radians.

Transformation of an N-point data sequence results in two sets of independent magnitude and phase values of N/2 points each in the associated spectral domain. Having selected the required magnitude values, the phase values are obtained from a scrambling algorithm given by Pettitt (1983) and Ditmar (1977) as:

$$\phi(k) = \begin{cases} 0, & k = 0 \\ s(k)\frac{2\pi}{N}, & k = 1, 2, \ldots, N/2-1 \end{cases}$$

Here, the integer N is the length of the FFT array. The factors s(k) are pseudo-randomly ordered integer values in the range 1, 2, . . . , N/2−1 taken from the register outputs of a v-bit chain code generator, where v=$\log_2$(N/2). The phase distribution over the full Nyquist range is:

$$p[\phi] = \frac{1}{N} \sum_{k=-(N-2)}^{(N/2)-1} \delta\left(\phi - \frac{2\pi k}{N}\right)$$

The resulting time sequence has Gaussian properties combined with a low relative peak factor value. The spectral envelope is programmable and can be matched to system requirements to address system response non-linearities.

Due to the frequency-domain correspondence and the bidirectional properties of the discrete Fourier transform, the signal's amplitude probability density function, p(x), can be expected to resemble the normal distribution. The PRGN signal is derived from a Pseudorandom Binary Signal (PRBS) and may therefore be viewed as a form of periodic band-limited Gaussian distributed perturbation. This signal finds the same application in periodic-based, direct spectral estimation procedures using the periodic transfer-function estimator of $$\hat{G}_{xy \cdot u_0} = \frac{Y_n}{X_n},$$

as the application of Gaussian noise in cross-spectral estimation procedures using the stochastic estimator of equation:

$$\hat{G}_{xy} = (\overline{X_n^* Y_n}) \cdot (\overline{|X_n 51^2|})^{-1}$$

Where the normalized magnitude squared regression coefficient between the phasor sets {X} and {Y} is known as the "squared coherence" between the phasors:

$$\hat{Y}_{xy}^2 = (|\overline{X_n^* \cdot Y_n}|^2) \cdot (\overline{|X_n|^2 \cdot |Y_n|^2})^{-1}$$

With a uniformly selected magnitude spectrum, the signal's autocorrelation function $R_{xx}(\tau)$ becomes a sine-cosine function which is periodic with the same period T as the time sequence x(t,T), and with zero crossings at intervals of T/N=Δt. Samples taken at intervals Δt are therefore uncorrelated and a total number of N uncorrelated samples can be obtained from the signal. The degrees of freedom (DF) of this signal are the same as for a signal in equivalent bandwidth (EB) format with equivalent DF (EDF)= $2B_e T=N$, and where N/2 complex estimates are obtained of the harmonic spectrum, placed at N/2 discrete frequency ordinates. The signal's EB is therefore N/(2T). As a result the digital-to-analog (DAC) and analog-to-digital (ADC) converters can sample at Nyquist, the spectral entropy, H, is obtained from a discrete version of equation $H = -\int_{-B}^{B} \rho(f_x) \cdot \ln[\rho(f_x)] \cdot df_x$, where the relative probability of each of the N equal harmonies $\rho(f_k)$ is 1/N. For a v-bit chain code generator:

$$H = \sum_{k=1}^{N} \frac{1}{N} \log_2(N) = \log_2(N) = v + 1$$

Therefore for this type of signal, EDF and H are related by:

$$H = \log_2(\text{EDF})$$

To satisfy compatibility with the radix-2 FFT algorithm to minimize computational effort, the desired complex conjugate spectrum in the frequency domain of length N can be padded with zeros to a length mN (m integer) and then inverse-transformed using the FFT algorithm. This results in an (m−1) point interpolation between the original N data points. The resulting test signal data points are applied to a DAC which is then oversampled at a rate of m times the rate at which the measured system response signals are sampled. The first alias frequencies are now shifted to (1−0.5 m) times the sampling frequency of the interpolated signal. The combined effect is to greatly reduce the amplitude of the first alias. By this method, the need for sophisticated guard filters and the attendant differential measurement errors are eliminated, thus reducing the complexity of the RF system compared to standard communication systems. If required, the interpolation can be adjusted such that the amount of first alias is below the minimum resolution of ADCs which are used in the system.

This specification describes one or more embodiments that will be described in terms of one or more examples, with reference to the accompanying figures. In the figures, like reference numbers indicate identical or functionally similar elements. Those skilled in the art will appreciate various approaches and features that may be used individually or in combination with each other as desired.

It will further be appreciated that embodiments of the disclosure described herein may be comprised of one or more conventional processors and unique stored program instructions that control the one or more processors to implement in conjunction with certain non-processor circuits, some, most, or all of the functions of a system and method for the pseudo random multi-carrier communication described herein. The non-processor circuits may include, but are not limited to, a radio transmitter, radio receiver, clock circuits, power source circuits, and user inputs devices. As such, these functions may be interpreted as steps of a method for achieving the pseudo random multi-carrier protocol in a wireless communication network. Further, it is expected that one of ordinary skill, when guided by the concepts and principles disclosed herein will be readily capable of generating such software instructions, programs, circuits and devices with minimal experimentation.

Embodiments of the disclosure may thus be implemented in hardware, firmware, software, or any combination thereof for performing certain actions as described herein. For example, ASICs may be fabricated to implement some or all of the processing steps described as well as more generic programmable logic options such as FPGAs and DSPs. It should be appreciated that the descriptions are merely for convenience and that the actions in fact result from computing devices, processors, controllers, or other hard-wired devices or devices executing the firmware, software, routines, instructions, etc.

Embodiments of the disclosure provide a system and method for pseudo random multi-carrier communication that is resistant to malicious and non-malicious interference in a wireless network. At a high level, the pseudo random multi-carrier (PRMC) process of transmission and reception starts with a raw message that is encoded to produce a stream of bits, or symbol bins in the frequency domain, of the waveform to be transmitted. The waveform spans the pertinent frequency bandwidth and is functionally divided into bins, where a symbol is a combination of two frequency bins, and either results in energy in a bin (i.e., a "mark") or it does not (i.e., a "space"). At the receiver, the symbol bins are seen and decoded with an inverse process to the transmitter resulting with the raw message. PRMC is thus a physical layer RF communication protocol that is designed to be resistant to malicious and non-malicious interferences. This technique is particularly advantageous when the RF bandwidth is wide and the bin count is high. However, the disclosure is flexible across different systems in terms of generating a variety of signals to match the capabilities of the hardware and channel environment in terms of, for example, sample rate, bandwidth, number of lines, and line spacing.

The bandwidth, for example, may be as wide as a Gigahertz, but certain embodiments of the disclosure follow what has been implemented in orthogonal frequency-division multiplexing (OFDM) type protocols such as Wi-Fi and LTE with regard to the number of spectral lines and the RF bandwidth used. Because of the superior signal-to-noise (SNR) of the PRMC, however, the number of spectral lines used in a given RF bandwidth can be more than double that of OFDM. In addition, unlike OFDM, for example, adjacent spectral lines can be used to transmit information at the same time.

Figure 2:
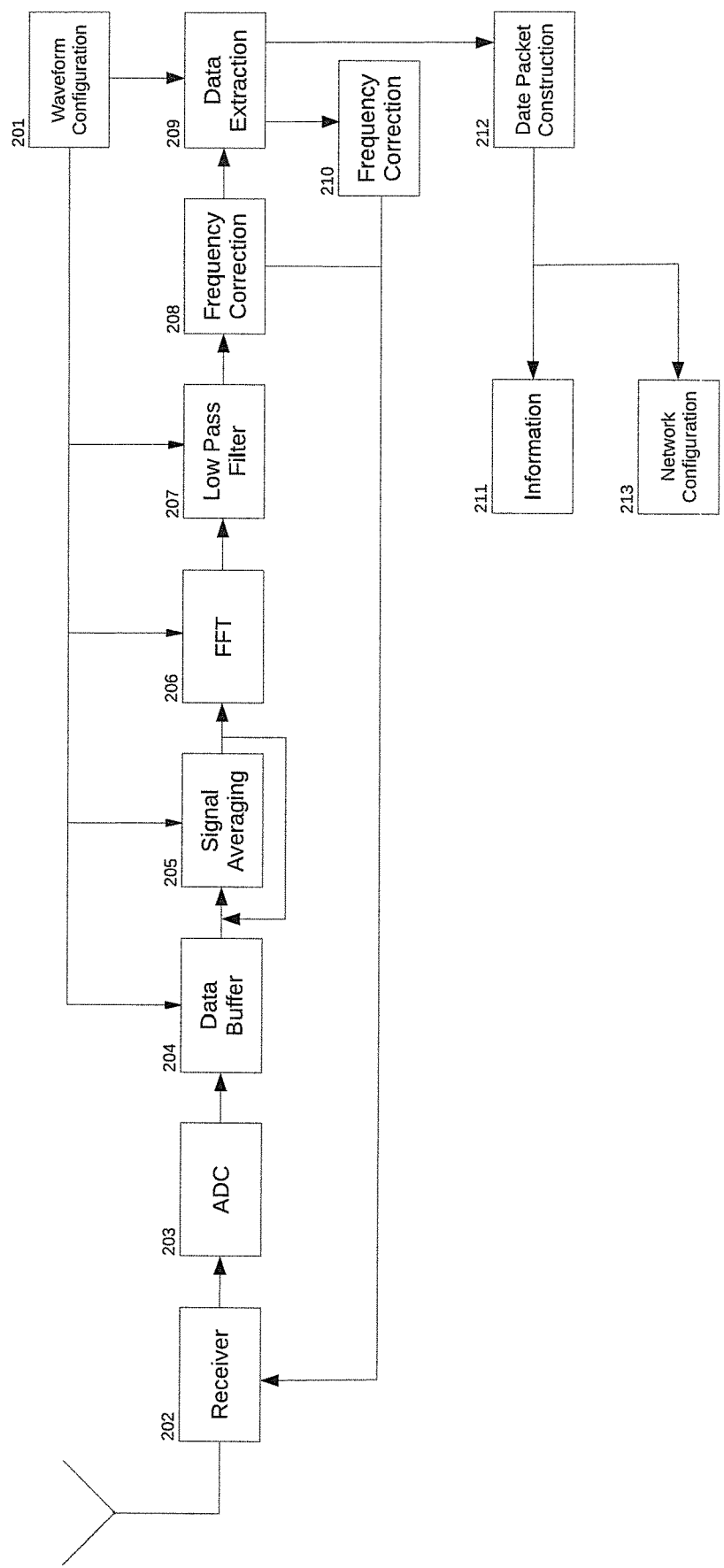
FIG. 2 is a block diagram of the receiver portion of the pseudo random multi-carrier system and method.

FIGS. 1 and 2 are block diagrams of the transmitter and receiver portions of the pseudo random multi-carrier system and method illustrating various components and steps. Referring now to FIG. 1, at the transmitter, information data 101 is sent across the wireless communications link in accordance with the disclosure. A packet of data is generated 102 from the information data, where the information data is encapsulated within the data payload of the packet. Incoming packet data is formed into blocks suitable to be encoded 103, where the block size is defined by the PRMC waveform configuration 111, The data blocks are encoded 104 and an OR operation 105 of the data blocks and pilot tones 110 is performed.

After being decoded the pilot tones are used to set the frequency correction at the receiver, if required. The operator has the option to choose between equally spaced, static pilot tones (like that used in OFDM, for example), or to encode a pilot tone message (which is not secret), and OR the static pilot tones or the encoded pilot tone message with the encoded message. Encoded pilot tones have the advantage of obscuring their location to an observer.

The PRMC waveform is generated 106 based on the data packets and digital-to-analog (DAC) conversion is performed 107 prior to wireless transmission. The RF transmitter up-converts the PRMC waveform from baseband to RF for transmission 108. Network configuration information 109 is used by the system, for example UDP port number, IP Address, and MAC address to build up an Ethernet packet. The configuration information of the transmitter that sets the properties used for encoding and generation of the PRMC waveform are not secret and would be known at the receiver. This would include the sample rate, the number of spectral lines, and physical layer encoding, particularly the symbol period 111.

Referring now to FIG. 2, at the receiver, waveform configuration information 201 for the receiver sets the properties used for decoding the PRMC waveform received. The RF receiver 202 down-converts the incoming RF signal to baseband. An analog-to-digital converter (ADC) 203 converts the received signal back to digital form and a buffer 204 is used to size the received incoming data for processing. Signal averaging 205 is carried out in some embodiments to improve the signal-to-noise ratio before the fast Fourier transform (FFT) 206 at the length defined by the PRMC waveform properties. The received data is filtered 207 to discard unwanted noise and channel properties and frequency correction is calculated 208. The received data is identified and decoded 209 then received data packets are reconstituted 212 and information received across the communication link 211. The receiver is synchronized with the transmitter using the encoded pilot tones, if required 210. Network information used by the system, for example UDP port number, IP Address, and MAC address is configured 213 consistent with the transmitter.

Further describing methods of the disclosure and referring back to FIG. 1, information data 101 to be sent across the communication link can be anything: from voice, text, signaling or file data, etc. Generation of the data packet 102, which in some embodiments is an Ethernet packet, is where the information data is encapsulated within the data payload of a packet. An incoming data packet is formed into blocks 103 suitable to be encoded, where the sizes are defined by the PRMC waveform configuration. Encoding can be any known encoding scheme that encodes binary data. An exemplary embodiment uses concurrent code, which is a subset of superimposed codes defined by BBC, to allow for desired properties of resistance to normal interference as well as jamming. Referring back to FIG. 2, to recover the PRMC waveform the ADC 203 samples at the Nyquist frequency. The resulting ADC data rate is slightly reduced compared to conventional signals that have to sample at greater than twice the signal bandwidth making follow-on processing lighter due to a reduction in the number of samples per second to be processed.

Figure 3:
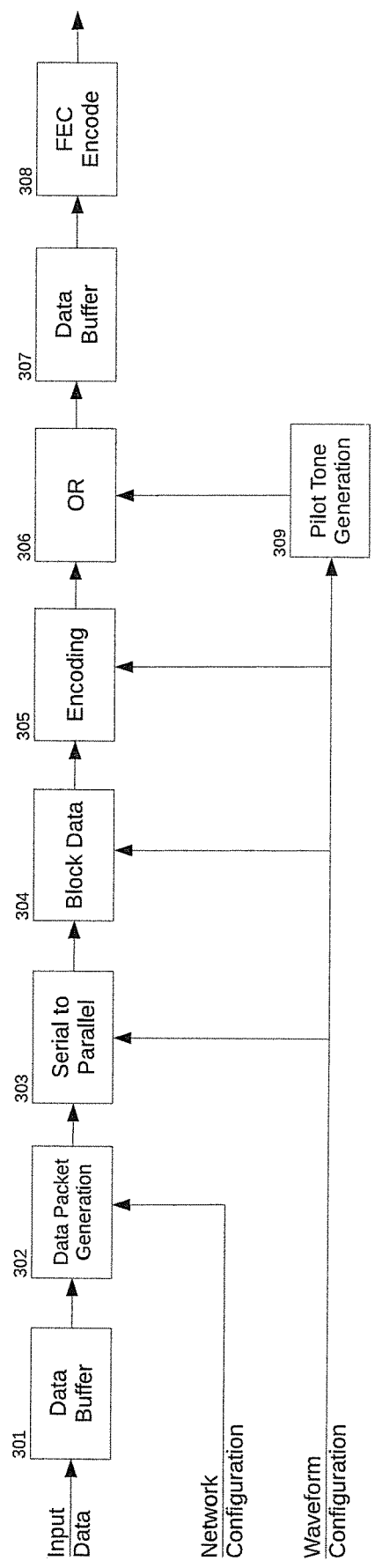
FIG. 3 is a block diagram illustrating the data packet generation, formatting, and encoding of the pseudo random multi-carrier system and method.

FIG. 3 illustrates data packet generation, formatting, and encoding of the pseudo random multi-carrier system and method. The first stage data buffer of the incoming information is stored together to become the data packet payload 301. A data packet is generated 302, typically an Ethernet packet, where the information is encapsulated within the data payload of the packet. The data is converted from serial to parallel 303 to enable the use of data blocks within the system. A second data buffer 304 is used to block the data into sizes suitable for encoding, where the size is a function of the PRMC waveform to be transmitted and a matter of design choice. The data packet is encoded 305 and OR'ed with the pilot tones 306 generated at 309. A data buffer 307 is used to smooth the data output from the encoder prior to further processing. Forward error correction (FEC) 308 is optionally applied to the encoded data packet.

More particularly, the PRMC process begins with user information, such as voice, text, or file data that is to be transmitted over the communication link. The user information is buffered 301 until there is enough data to comprise the payload of a data packet. The size of the buffer is dependent on the type of packet generated, but is typically on the order of a few kilobytes. As noted, when there is enough information, data packet is generated 302. In certain embodiments, the data packet is an Ethernet packet, which is made up of a UDP packet and an IP packet. At this stage, the Ethernet packet will be complete with MAC address and IP address and UDP port number. The Data Packet Generation stage 302 goes from Presentation Layer to Network Layer. The remaining parts of the PRMC system can be roughly thought of as the Data Link and Physical Layer.

After data packet generation, the data is converted into parallel 303 such that the data is concatenated into blocks based on the number of symbol bins 1101, or spectral lines, that are used in the PRMC waveform 304, where a symbol bin is referred to as the combination of the frequency bin which can be encoded with a bit of information by setting the magnitude and phase and the adjacent frequency bin, on the right for example, which is always set to zero 1101. Typically the bin that can be encoded would be left and the zero bin is on the right (but the opposite configuration can be used). The two bins together are what make a symbol bin 1101 in PRMC. Typically the number of symbol bins is a radix 2 number such that it matches the FFT length. Although not fixed, the number of symbol bins are a function of the DAC clock rate and the length of the PRBS used to generate the PRMC waveform. Each block of data is then encoded 305. The process takes the blocks of data packets containing the original information and encodes them using a technique where hashed values of the data are superimposed on to each other (e.g., a Bloom filter). The hash function and encoding technique can be public (not secret) without compromising the resistance to interference. The steps of encoding are influenced by the length of the time domain PRMC waveform and the data rate. In the encoding process, additional error correction bits can be added to the data to speed up the decode process in the receiver, in particular to reduce the number of decode attempts that are required.

In parallel to the information encoding, a pilot tone message is encoded in the same way 309. The pilot tone message, which can be equally spaced static pilot tones or an encoded message, are known by the transmitter and receiver and are not a secret. The two data packets are OR'd together 306 to form one stream of encoded data. The new data packet is buffered 308 for the FEC encoding 307. There are many options that can be chosen for FEC. In certain embodiments of PRMC, FEC may be best implemented by, for example, interleaving across symbol bins across multiple data packets to provide frequency diversity and resistance to malicious and non-malicious interference. The pattern used to decide how to interleave the symbol bins may be chosen at configuration time. An illustrative technique would be to implement that used in orthogonal frequency division multiple access subcarrier coding. Once the data packets have been generated the next step in the transmitter system is to generate the PRMC waveform.

Figure 4:
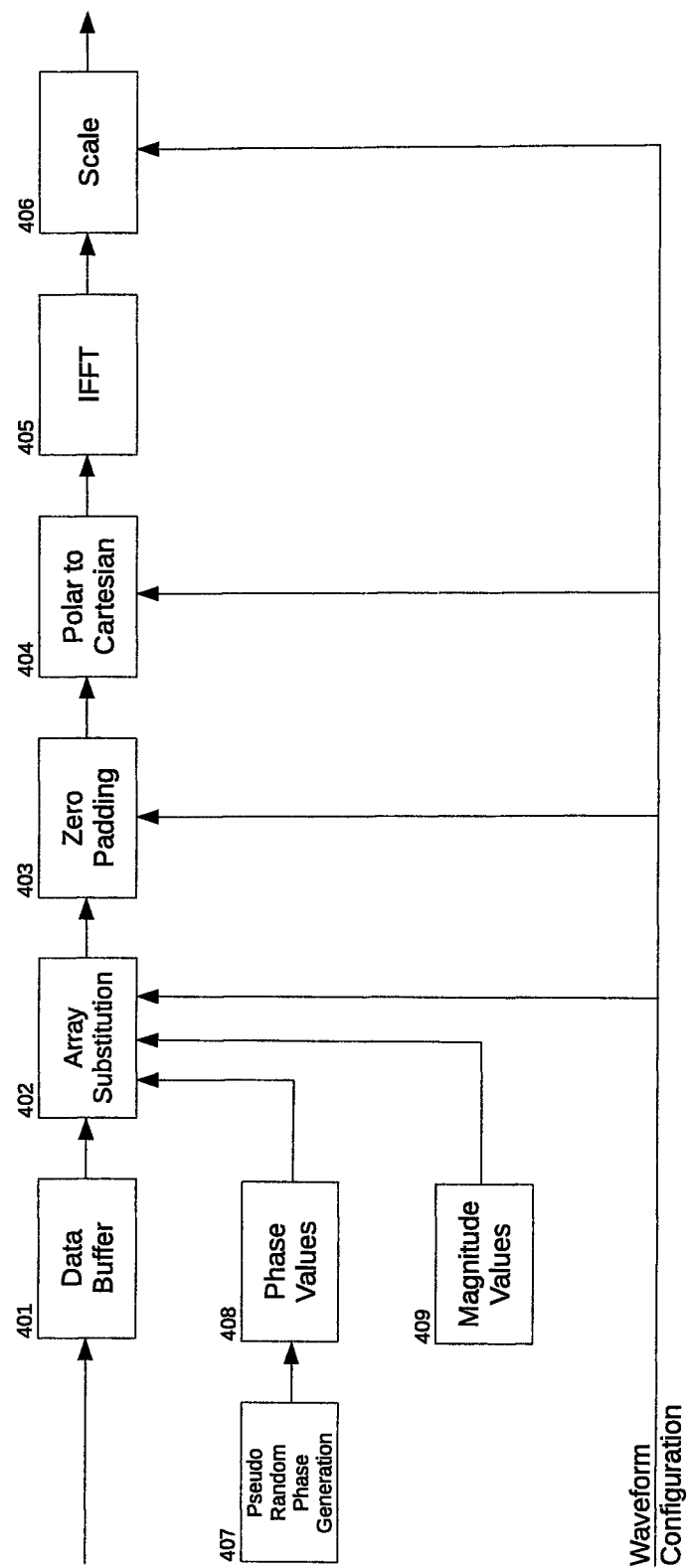
FIG. 4 is a block diagram illustrating the pseudo random multi-carrier waveform generation of the system and method.

FIG. 4 illustrates pseudo random multi-carrier waveform generation of the system and method. Data buffer 401 is used to store the data output of the FEC encoder. The data packet stream of "1's" and "0's" is arranged into magnitude and phase values 402. Zeros are placed in the PRMC waveform data array to represent zero padding in the frequency domain 403. The PRMC waveform is converted from Polar Coordinates (r, θ) to Cartesian Coordinates (x, y) 404 and an inverse fast Fourier transform (IFFT) generates a time domain signal 405. The PRMC waveform is scaled to optimize the output to the resolution of the transmitter DAC 406. A pseudo random number generator 407, for example, configured as described in *Perturbation Signals for System Identification* edited by Keith Godfrey (1993), Ch. 13, which is incorporated herein by reference in its entirety, is used to produce the phases for the PRMC waveform. It should be understood, however, that pseudo random or random phases can be generated by other techniques, which may result in an increased peak-to-average power ratio (PAPR) and thus reduce power efficacy of the transmitter amplifiers. Memory locations are used to store the pseudo phase values for the PRMC waveform 408 and the magnitude values for the PRMC waveform 409 (typically normalized to "1", but could include values that account for non-linearities in the transmitter).

More particularly, in advance of data packets being used in the generation of the PRMC waveform, the parameters of the PRMC waveform is calculated. This includes the magnitude and phases of the spectral lines that the PRMC waveform will exhibit when transmitted. The magnitude values 409 are fixed values and typically will be an array of "1's". However, as noted, the exact values can be changed to compensate for non-linearities in the system. For example, compensation for non-linearity in the power amplifier (PA) of the transmitter. Compensation for non-linearities can be achieved by calibration of the system against the PRMC waveform to produce an array of values that, once transmitted, will result in a flat bandwidth signal. In practice, this may be achieved by measuring the system frequency response over the RF band of interest and scaling the spectral lines between 0 and 1 based on the inverse of the system frequency response, as would be done for a compensation filter, for example. Such compensation may be performed on the fly to compensate for slow fading channels, for example, and channel information is fed back from a receiver. Such techniques do not significantly impact the transmission of information as would be seen with a QAM signal, for example.

Calculation of phase values is generated based on the number of spectral lines required in the PRMC waveform. In some embodiments, a pseudo random number generator 407 is used to generate the phase values, where the values are equally spaced around the unit circle. The phases can be generated on the fly or be predefined. Typically, only one set of phase values are required 408.

To generate the PRMC waveform with the encoded data information or data packets, each bit of the data packet of buffered data 401 is substituted 402 with a magnitude and a phase. If the bit from the data packet is a "1", the magnitude value is set to a "1" and the phase is set to a non-zero value less than $2\pi$ output from the pseudo random number generator (i.e., a pseudo random phase). When the data bit in the data packet is a "0", the magnitude and phase are set to zero. The output of the array substitution is a magnitude and phase assignment for every spectral line of the PRMC waveform. This defines which combination of spectral line and adjacent bin represent a symbol bin 1101 that could be a "1" or a "0" but where the adjacent bin will always be a "0" 909.

The adjacent bin to the right, which is not a spectral line, is given a magnitude and phase of "0". This provides zero padding between each spectral line and strengthens the decode process. To prevent aliasing at the output of the DAC, zero padding of the PRMC waveform is implemented by adding zeros to the PRMC waveform array containing the magnitudes and phase 403. The zero padding may comprise a range of frequencies above and below the PRMC waveform array. The location of the zero padding 908 in the array is such that, after the Inverse fast Fourier transform 405, the real part of the waveform and complex part of the waveform are placed from DC to $f_s/2$ and from $-f_s/2$ to DC, respectively.

Next, the array of magnitude and phases are converted from Polar to Cartesian coordinates 404. The time-domain PRMC waveform is then generated by doing an IFFT 405 on the array of complex values. Once generated the time domain waveform is scaled to match the resolution of the DAC in the transmitter to optimize the Peak to Average Power Ratio. This is implemented, for example, on a snapshot-by-snapshot basis to minimize the PAPR of the transmitted PRMC waveform and increase the efficiency of the transmitter RF system.

Figure 5:
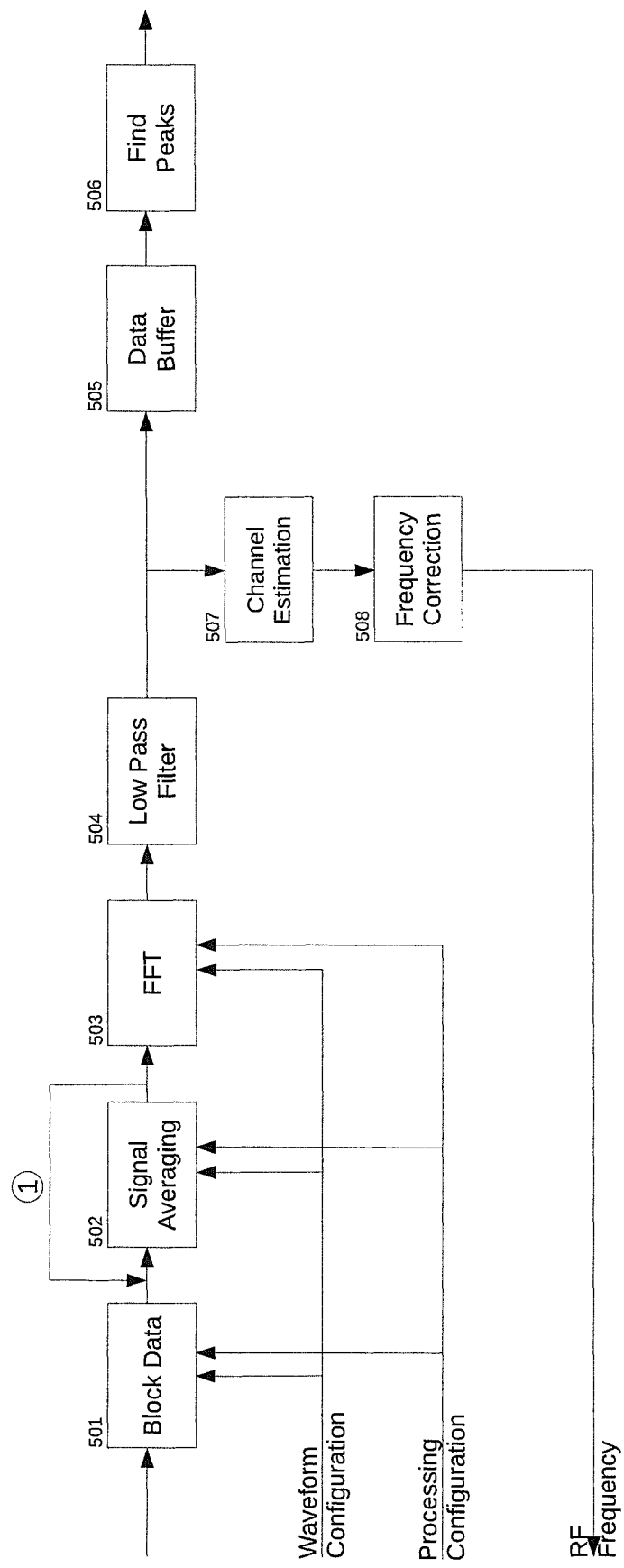
FIG. 5 is a block diagram illustrating the averaging, FFT, filter, synchronization, and data extraction of the pseudo random multi-carrier system and method.

FIG. 5 illustrates signal averaging, FFT, filter, synchronization, and data extraction of the pseudo random multi-carrier system and method. A buffer 501 is used for the incoming data from the receiver ADC to format data based on the PRMC waveform configuration. Signal averaging 502 may be carried out to improve the SNR of the received signal before FFT. The number of averages to perform is decided based on the SNR of the received signal and is not always required. An increase by $2^n$ times will typically improve SNR 3 dB per increase in n. As the number of averages increases, however, the data throughput decreases linearly. The length of the FFT 503 is based on the PRMC waveform and processing gain required. An increase in the length of the FFT by multiples of the length of the PRMC time-domain signal increases the gain of the signal by approximately 3 dB per $2^n$ increase in FFT length. This is due to the unique periodic inverse repeat properties of the pseudo-random multi-frequency waveform, more particularly the absence of phase modulated components within the waveform conveying information. Like signal averaging, increasing the FFT length affects data throughput and comes at the cost of increased complexity in the decode process when determining the location of peaks 506. The strategy undertaken to improve signal SNR, therefore, is based on the type of signal being transmitted and the performance of the system implemented. A low pass (Nyquist) filter 504 is used to filter the PRMC waveform to discard noise and reduce the size of the data stored in the system. Data buffer 505 is used to prepare the data for symbol bin search and peak detection and 506 is used to determine symbol bin locations. When required, channel estimation 507 is used to aid RF frequency correction and calculation of the frequency correction based on PRMC pilot tones 508. Results are exported to the RF receiver.

More particularly, the received ADC samples are buffered 501 until the number of samples equals the length of the time-domain PRMC waveform to produce a data block. Due to the unmodulated nature of the waveform, signal averaging 502 is carried out to improve the signal-to-noise ratio of the received signal where successive incoming data packets are added together and the resulting aggregate data packet is divided by the number of additions to reduce the amount of random noise on the signal. The amount of averaging is known by the transmitter at the time of transmission. The number of averages decreases the data throughput linearly. A FFT is performed on each received data block 503. Typically, the length of the FFT equals the length of the time-domain snapshots transmitted, however, the length of the FFT can be increased to provide processing gain on low SNR signals, which may come at the potential cost to data throughput and require coordination with the transmitter. The FFT output is low pass filtered 504 in the frequency domain by discarding the bins outside the PRMC waveform frequency range that are noise. The bins are equivalent to the zero padding added in the transmitter 403 during PRMC generation and reduce data rate by up to 50% in some cases. A Nyquist filter halves the number of samples per second transferred through the decode process. The output of the filter is buffered 505 into blocks for symbol bin identification 506. This process involves identifying peaks in the frequency domain that represent the encoded data packet. Peak identification is accomplished by use of a threshold, above which constitutes a mark ("1") and below which constitutes a space ("0"). The threshold setting is a matter of design choice. The overall process is made possible by the nature of the zero padding that was done when generating the PRMC waveform in the transmitter, the placing of "0" magnitude and "0" phase values in between each information magnitude and phase values ("1" or "0") 907.

Channel estimation 507, like Least Mean Square (LMS) techniques, can also be performed on the snapshot output by the low pass filter 504. This allows for frequency correction to be done using a standard pilot tone method like that of OFDM, which can then be applied to the RF receiver. However, this type of frequency correction, where pilot tones are placed in the spectrum alongside the information tones, is susceptible to malicious interference. As such, this section (507 and 508) may optionally be bypassed and frequency correction may be done later in the PRMC system processing chain (e.g., 607 and 608).

Figure 6:
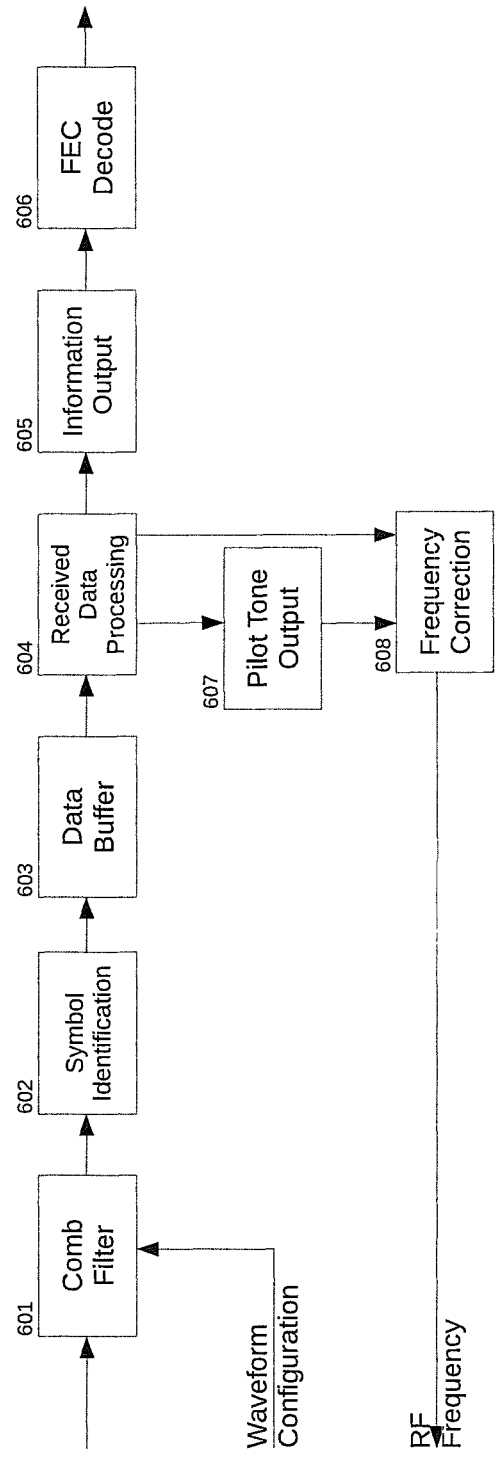
FIG. 6 is a block diagram illustrating the data extraction and synchronization of the pseudo random multi-carrier system and method.

FIG. 6 illustrates data extraction and synchronization of the pseudo random multi-carrier system and method. A comb filter 601 is used to discard the FFT bins that are not required in decoding, which is based on the PRMC waveform parameters. The symbol in each bin is determined 602 of the current snapshot and a data buffer 603 holds the current received snapshot to be decoded 604. The decoded data packet output is buffered 605 and FEC decoded 606 in addition to the pilot tones packet 607, which is used to calculate the frequency correction 608. The result is exported to the RF receiver.

More particularly, as the information in the PRMC waveform is contained in the spectral lines and not the gap between them 1101, where the "0" magnitude and "0" phase value were placed (i.e., the zero padding), a comb filter 601 can be applied to PRMC waveform snapshot to remove every even numbered bin. This digital operation is equivalent to writing "0" in the bins. At this point the level of the magnitude is stored 602, a high magnitude relative to the noise floor is assigned as a "1" and a low magnitude relative to the noise floor is assigned as a "0". These results are stored in buffer 603 and then the received data is processed 604. The output of this stage of processing is decoded data packets containing the information 605, the encoded data, and the pilot tones message. Data packets decoded successfully are passed to the FEC decode 606, which reverses the pattern used to interleave the data packets at the transmitter. The pilot tone message 607, which is decoded alongside every data packet if present, is used to carry out frequency correction 608 in a conventional way, but without being affected by an adversity. As the pilot message is known by the transmitter and receiver, and is not a secret, it can be readily used like a standard pilot tone technique and does not require further processing. Based on this, frequency correction can be applied to the RF receiver.

Figure 7:
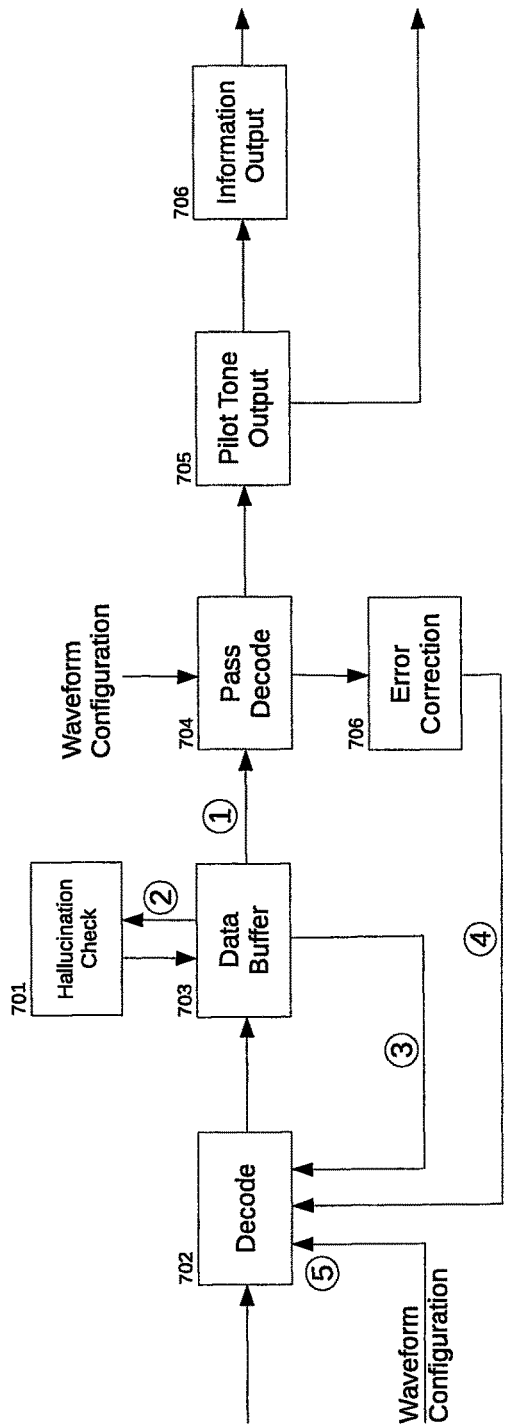
FIG. 7 is a block diagram illustrating the received data processing of the pseudo random multi-carrier system and method.

FIG. 7 illustrates received data processing of the pseudo random multi-carrier system and method. A current snapshot of data is decoded 702 and buffered 703. A check to validate if each snapshot is a hallucination or not is performed 701 (as defined in BBC concurrent coding, for example). This can be achieved a number of ways based on the type of data being transmitted on the communication link. For example, by knowing the range of values to process, this could be achieved by setting the first value of every 8-bit value to "0" and hence halving the number of possible results that could be valid (at the cost of data rate). At the same time, it is determined whether the received snapshot is a possible valid packet based on the type of information expected at the receiver. For example, parsing the data packets for expected content 704. If the hallucination check 701 fails, the snapshot can be dropped or another attempt to decode the snapshot can be taken depending on the level of effort that is being applied to the decode process. If the hallucination check does pass, it is up to 704 to assess the received data packet and drop it if required. In the case where a possible valid decoded packet is produced and optionally further checked 704 if the packet is within a valid range, it is done with knowledge of the data type transmitted over the communication channel. The checks speed up processing but they are not essential to the decoding capability of the system. If the decoded packet at this point is considered to be invalid, burst error correction is applied 707 to the current snapshot. This may be done using properties of the BBC algorithm that provide strength against malicious and no malicious interference. Whereby adding a "1" in symbol bin locations that are currently received as "0" the decoding will process the snapshot differently based on the assumption that a "0" has been received in error and by flipping the symbol bin to a "1" the correct data is decoded.

There are limits to the technique. The number of "1"s that can be added including the "1"s already present, is typically around 30% of the symbol bins, but can be as high as 50% depending on the communication channel and the type of interference to which the waveform is exposed. Another consideration is in the number of iterations that can be sensibly carried out on the processing platform. An optimal solution includes multi-core, multi-threaded processing done in software or pipelining and parallelization if preformed on an ASIC or FPGA. The location of the correction bits should be optimized for the communication channel. The format of error bits that are added to the current snapshot should take into account the nature of the channel and the communication application. If deep fading is seen in a slow moving channel, for example, then the error correction bits should be a contiguous number no more than an eighth of the number of system bins. In a faster moving channel the location of error correction bits will be more effective when distributed through the snapshot. This is because potential errors will be seen across the full bandwidth and not localized.

It should be apparent that the nature of the algorithm used (i.e., superimposed/concurrent code) means that the correct result is within the snapshot, but significant processing may be required to successfully decode it. As such, the number of decode attempts may be capped at a number that is comfortable for the processing platform. As referenced, an artifact of the decoded process is hallucinations, which are successful decodes with an invalid result. By adding an additional bit to the encoded words at the transmitter, a simple check can be carried out 701. For example, if a "0" is added as the most significant bit of the encoded words, the hallucination check only needs to check one bit on the decoded snapshot to half the number of data processing cycles.

Once passed checking, the outputted data packet will contain both information and pilot tones, if used. The pilot tone is extracted 706 and can be used for frequency correction 606, for example. After pilot tone extraction, the resulting output contains the message information 706.

Figure 8:
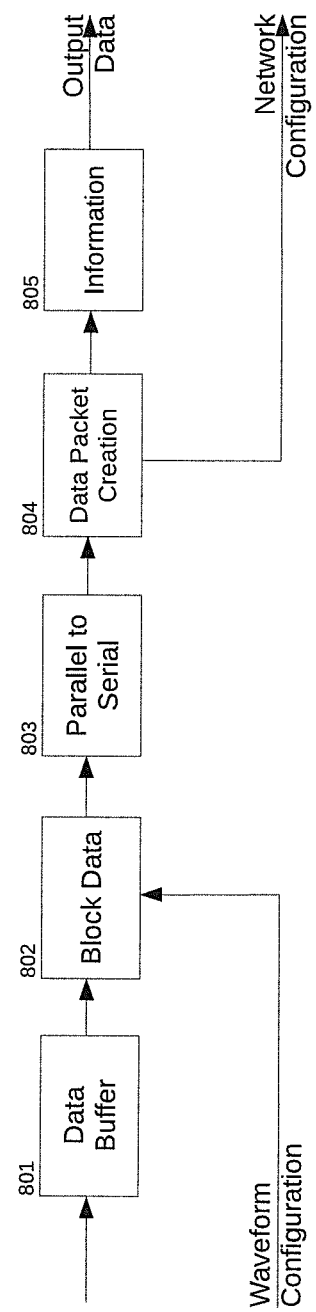
FIG. 8 is a block diagram illustrating the data packet construction of the pseudo random multi-carrier system and method.

FIG. 8 further illustrates data packet construction of the pseudo random multi-carrier system and method. Data buffer 801 is used to manage the transmission between decode and packet reconstitution. The received data is formed into block sizes based on the PRMC waveform parameter 803 and then converted from parallel to serial 803 and formed into data packets containing the information 804. The network parameters are also retrieved from the packet. The information received across the communications link 805 can be anything from voice, text, signaling, or data, for example. More particularly, after decode, the snapshots are buffered 801 and blocked up 802 to make the transition from PRMC waveform lengths to standard word lengths. Converting from parallel to serial data 803 and creation of the data packets received 804 enables extraction of the information and network parameters from the Ethernet packets once parsed.

Figure 9:
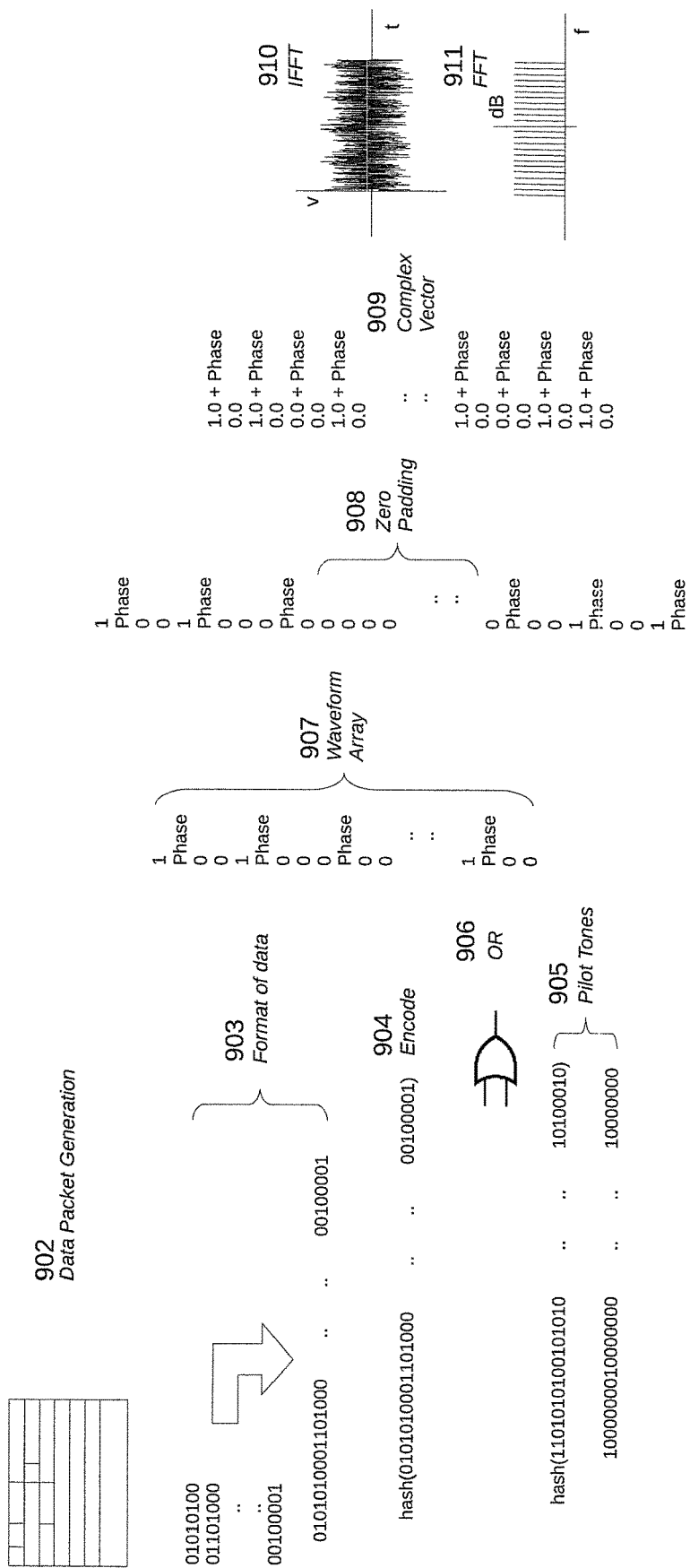
FIG. 9 is a diagram illustrating the transmitter data flow of the pseudo random multi-carrier system and method.

FIG. 9 further illustrates transmitter data flow of the pseudo random multi-carrier system and method. The transmitter data flow from the user generated information data to the output that is applied to the transmitter is depicted. A message, which is a text string in this example 901, is encapsulated within an Ethernet payload 902. This results in an array of binary numbers. This is formatted into a stream that is of appropriate dimensions for the encoding 903. The size of the array is proportional to the number of symbol bins required in the transmitted PRMC waveform.

The data is then encoded 904 as previously described in 305. At the same time, a pilot tone message is generated 905, which can be of the two types determined in 110. The two messages arrays are formatted to be compatible sizes and OR'd together 906. The stream of data is thus an encoded Ethernet packet with encoded pilot tones in the form of a stream of "1's" and "0's". The stream of "1's" and "0's" is then used to define the shape of the PRMC waveform in the frequency domain by associating the stream with a pseudo random phase and spacing them with zero padding. The waveform is thus a list of magnitude and phases that represent spectral lines conveying the information and the spaces between the spectral lines when viewed in the frequency domain 907. Zero padding prevents aliasing at the output of the DAC, which is added to the array containing the magnitude and phases such that the real part of the PRMC waveform occupies 0 to ¼ of the array, zero padding is from ¼ to ¾ of the array, and a flipped version of the magnitude and phases is assigned to ¾ to 1 (908). The second magnitude and phases represent the complex part of the PRMC waveform after the IFFT. The next step is to convert the complex array 909 of magnitude and phases from Polar to Cartesian coordinates and perform an IFFT 910 to produce the time domain waveform for transmission.

Scaling of the PRMC waveform is performed for optimum transmission out of a DAC, which does not change the way the waveform is represented as a real time-domain inverse repeat pseudo random signal with optimized PAPR, where the frequency domain properties are a predefined number of spectral lines of the same amplitude using the full dynamic range of the transmitter system 911.

Figure 10:
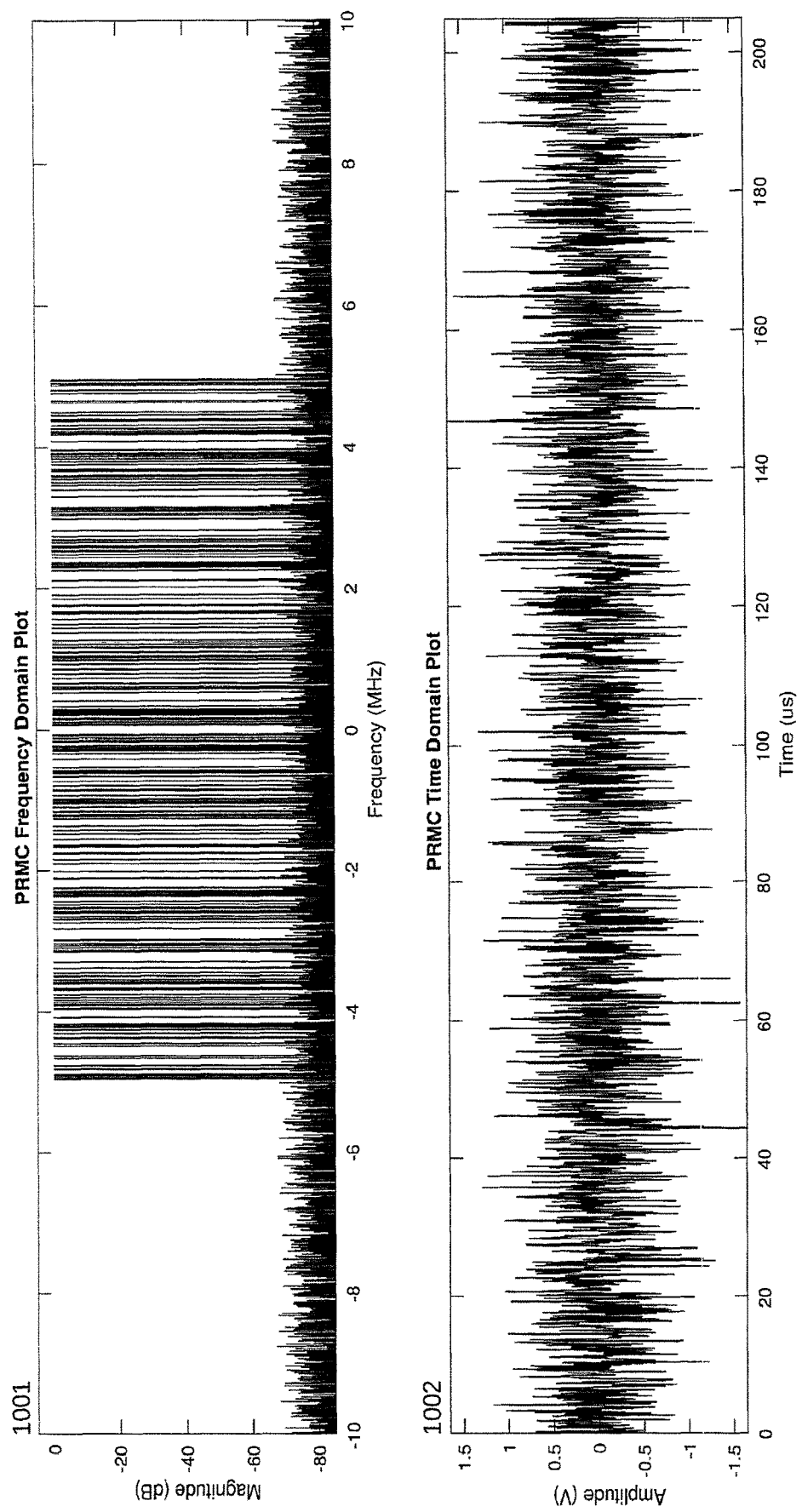
FIGS. 10-11 are plots of illustrative PRMC waveforms.

FIG. 10 shows a pseudo random multi-carrier waveform with an encoded message in the frequency domain 1001 and time domain 1002. In the example, the length of the message is 1024, resulting in 1024 symbol bins (and a total of 2048 bins). The corresponding amount of zero padding is of length 1024 at each side of the PRMC waveform, producing a waveform that is 4096 samples long. When sampled at 20 MS/s in the frequency domain 1001 of the PRMC waveform is 10 MHz wide about 0 Hz with 5 MHz of zero padding at each side. The time domain representation 1002 is a noise like signal of 4096 samples. When samples at 20 MS/s the resulting period of the waveform is 204.8 µs.

Figure 11:
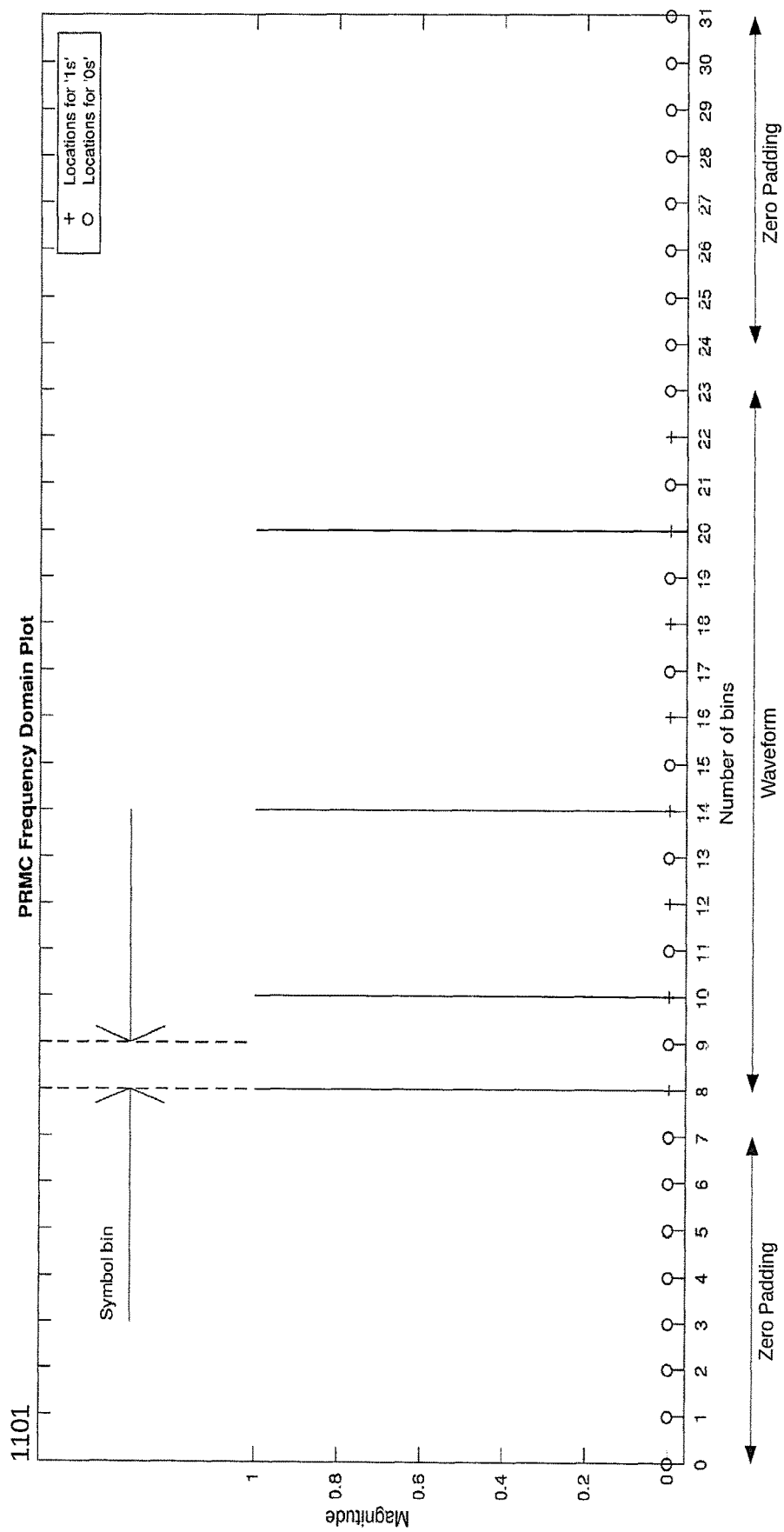

FIG. 11 shows a symbol bin in a representation of the PRMC waveform in the frequency domain 1101. In this example, there are 8 bins of zero padding from bin 0 to 7. The PRMC waveform is shown from bin 8 to bin 23. The remaining bins, from 24 to 31 are zero padding. Within the PRMC waveform the bin locations that can be a "1" or a "0" are depicted by a "+" and the bins that can only be a "0" are depicted by a "o" on the x-axis. Four bins are set to "1"—bins 8, 10, 14, and 20—and four bins are set to "0"—bins 12, 16, 18 and22. As shown, a symbol bin is made up of two bins (e.g., bin 8 and bin 9). In this example, bins pairs of bin 10 and 11 and bin 12 and 13 and so on also make up a symbol bin.

Figure 12:
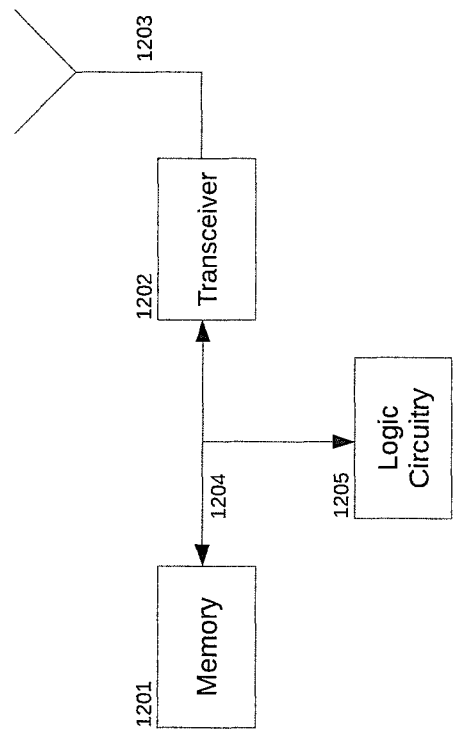
FIG. 12 illustrates a hardware architecture according to certain embodiments.

FIG. 12 illustrates a basic (computing device) hardware architecture according to an embodiment. The hardware architecture includes logic circuitry 1205, memory 1201, transceiver 1202, and or more antennas represented by antenna 1203. The memory 1201 may be or include a buffer that, for example, holds incoming transmissions until the logic circuitry is able to process the transmission. Each of these elements is communicatively linked to one another via one or more data pathways 1204. Examples of data pathways include, for example, wires, conductive pathways on a chip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Possible implementations of the memory 1201 include: volatile data storage, nonvolatile data storage, electrical memory, magnetic memory, optical memory, random access memory ("RAM"), cache memory, and hard drives.

Figure 13:
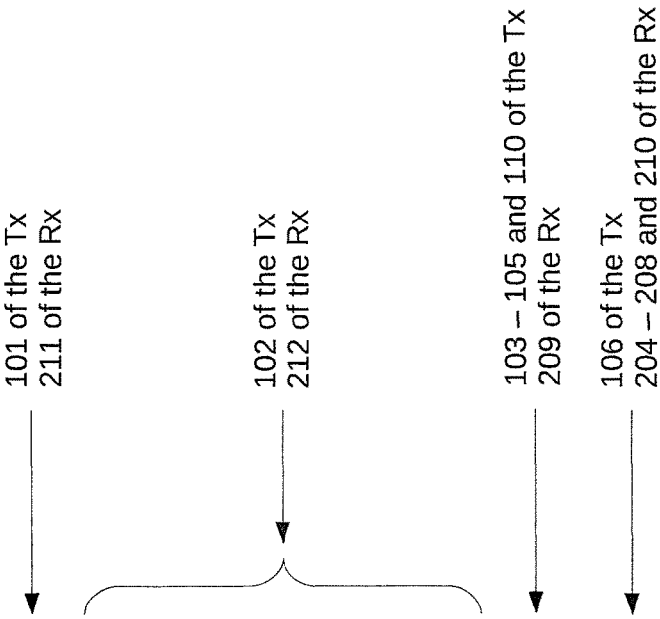
FIG. 13 illustrates the pseudo random multi-carrier stack of the system and method.

FIG. 13 shows the pseudo random multi-carrier stack of the system and method 1301. The Open Systems Interconnections (OSI) seven layer model describes and standardizes the communication functions of a telecommunication system. The different sections of a PRMC system can be aligned with the layers of this model to show the functions and interactions of each PRMC section in relation to the model.

The information blocks, 101 and 211 for the transmitter and receiver, respectively, are where information is generated and received. This may be anything from a voice application on a radio system or a web browser on a computer system, for example Layers 6 through 3 are captured by the Date Packet Generation for the transmitter 102 and the Date Packet Construction block for the receiver 212. In an Ethernet system, for example, this may include presentation of data from the host application, the UDP, IP, and MAC layers of a network stack where port, IP Address, and MAC Address are used. The PRMC system starts in layer 2. This is predominately where the encoding (103-105 and 110) and decoding (209) of the Ethernet packets occur. The PRMC waveform generation (106) and reception (204-208 and 210) occur at layer 1 of the ISO model.

There is a clear distinction between an OFDM system and a PRMC system regarding the Physical Layer. This is because the boundary between encoding and decoding plus waveform generation and reception is not as clear cut compared to the ISO model. In the PRMC system, the waveform cannot be generated independently of the encoded data (i.e., information to be transmitted) like that of an OFDM system where the data is modulated onto the Physical Layer carriers. Thus, in a strict sense the current PRMC system is not a modulation technique, but a novel technique of encoding information in a multi-frequency pseudo random signal.

The pseudo random multi-carrier communication method and system provides advantages over other techniques, such as 802.11p, for vehicle-to-vehicle communication. For example, the pseudo random multi-carrier communication method and system is capable of transmission and reception by multiple nodes simultaneously and is not reliant on GPS for time alignment of data packet or access to the communication channel like the contention based time division multiplex system like Wi-Fi and LTE. The pseudo random multi-carrier communication method and system is also resistant to multipath fading, particularly in urban environments. On the other hand, however, pseudo random multi-carrier communication method and system is generally not a high data rate solution such as Wi-Fi or LTE.

The pseudo random multi-carrier communication method and system may be used in keying of distributed nodes, like that of hand-held radios used by men or vehicles on the modern battlefield or the like, where the requirement for shared key can be limiting. The pseudo random multi-carrier communication method and system may be used to initiate communication in a trusted, jam-resistant, way. As noted, the tradeoff between resistance to malicious and non-malicious interferences comes at the cost of data throughput. Roughly, when implemented using a comparable number of spectral lines and over a comparable bandwidth, PRMC has a data rate close to that of a binary phase-shift keying (BPSK) modulated OFDM transmission. In contrast, however, an advantage of PRMC is that transmission by more than one PRMC system can be decoded at a receiver and the different messages recovered, even if transmission occurs at exactly the same time. In some instances, to counter the effects of fading for example, error correction bits may be introduced into a message for decoding, forcing all bits in the message within the snapshot to be treated as received symbol bins and relying on the properties of BBC to decode if any information was lost in that window due to fading.

Embodiments of the disclosure are useful for military and civilian applications. For example, sophisticated ad-hoc networks enable mobile nodes that comprise transceivers to communicate with each other and access fixed networks, such as the Internet. Malicious interferences related to ad-hoc radio networks, such as those used in military and civilian applications by personnel or vehicles, can be avoided. Indeed, vehicles may communicate with each other in noisy environments during simultaneous transmission according to the disclosure. GPS satellite jamming can also be advantageously avoided.

For example, embodiments of the disclosure are useful in a wireless mobile ad-hoc network. Such a network includes one or more portable network devices operable to support seamless operation of a self-initializing, self-healing, adaptive portable network, for example. The portable network devices generally implement protocols that provide bandwidth management capabilities for use with radios, routers, and other wireless network devices. Portable network devices include at least one wireless transceiver, a processor, and control software. The processor and control software are logically coupled to the wireless transceiver to facilitate digital communication via a plurality of communication channels with other network devices. Such tactical and other highly mobile communications networks are disclosed and described in U.S. patent application Ser. No. 11/435,287, filed May 17, 2006, and U.S. patent application Ser. No. 13/708,433.

Additional military and non-military embodiments of the disclosure include: Communication between ground station and Unmanned Airborne Systems, or drone, which is an aircraft without a human pilot onboard that is typically controlled from an operator on the ground; Missile telemetry data communicated back to a launch site; Transmission or beaconing of personnel location information (PLI) by military personal in the battlefield or first responders in adverse environmental conditions; Industrial Internet of Thing applications where system data of plant equipment is centrally hosted and/or analyzed in large facilities; A communication mode used when standard communication protocols fail in oversubscribed location areas, like that or music festivals, disaster situations, or the like; Critical car-to-car or car-to-street communications; etc.

While preferred embodiments have been set forth above and in the accompanying figures, those skilled in the art who have reviewed the present disclosure will readily appreciate that other embodiments can be realized within the scope of the claims herein and their equivalents. It is to be understood that the disclosure is capable of use in various combinations, modification, environments, and applications.

Adaptations of known systems and methods that are apparent to those skill in the art based on the description of the disclosure contained herein are within the scope of the claims. Moreover, later-developed equipment that carries out the methods or combination of elements set forth in the claims are within the scope of the disclosure. Accordingly, the descriptions are not intended to limit the form or application disclosed herein.

What is claimed is:

1. A processing method for a wireless transmitting device comprising the steps of:
    formatting a parallel block of data bits of superimposed code of a predetermined length comprising at least one non-zero data bit;
    generating a pseudorandom noise signal that is synthesized from a pseudorandom binary signal spanning a frequency band, wherein the frequency band is divided into a plurality of contiguous symbol bins equivalent to the predetermined length and each of the plurality of symbol bins comprises an information component and a zero padding component, whereby there is a zero padding component between each information component of the plurality of contiguous symbol bins;
    encoding the information components of the plurality of symbol bins by setting a magnitude value and phase value for the at least one non-zero data bit, wherein the magnitude value conveys information and the phase value is assigned from a predetermined pseudo-random list of phase values that correspond to the plurality of contiguous symbol bins;
    logically OR'ing the parallel block of data bits with a pilot tone message that is not secret; and
    transmitting the pilot tone message with the encoded pseudorandom noise signal at different frequencies simultaneously, wherein the phase value does not convey information and is disregarded at a receiver that does not require prior knowledge of the phase value.

2. The processing method according to claim 1, wherein the phase values are assigned over an interval of $2\pi$ radians for the plurality of contiguous symbol bins.

3. The processing method according to claim 1, wherein the pilot tone message comprises an encoded message.

4. The processing method according to claim 1, wherein the setting of the magnitude values over the plurality of symbol bins varies to compensate for non-linearities in the transmitting device or in a transmission medium.

5. The processing method according to claim 4, wherein the setting of the magnitude values to compensate for non-linearities is performed on the fly to compensate for one or more fading channels based on information fed back from the receiver.

6. The processing method according to claim 1, further comprising the step of adding zero padding to a frequency range below and a frequency range above the frequency band of the encoded pseudorandom noise signal.

7. A processing method for a wireless receiving device comprising the steps of:
    receiving, by a receiver that does not require prior knowledge of a phase value, an encoded pseudorandom noise signal synthesized from a pseudorandom binary signal spanning a frequency band, wherein the frequency band is divided into a plurality of contiguous symbol bins equivalent to a predetermined length and each of the plurality of symbol bins comprises an information component and a zero padding component and wherein the information components of the plurality of symbol bins each have a magnitude value that conveys information and a phase value that does not convey information and was assigned from a predetermined pseudorandom list of phase values at a transmitting device for at least one non-zero data bit, such that there is a zero padding component between each information component of the plurality of contiguous symbol bins;

decoding the encoded pseudorandom noise signal by
- (i) analyzing each information component of the plurality of contiguous symbol bins by performing peak detection to determine whether a non-zero data bit is present, and
- (ii) zeroing each zero component; and formatting a parallel block of data bits of superimposed code of the predetermined length comprising the at least one non-zero data bit corresponding to the information components of the plurality of contiguous symbol bins and checking to validate whether the parallel block of data bits is a hallucination or not, and discarding the parallel block of data bits if the hallucination check fails.

8. The processing method according to claim 7, further comprising the step of filtering the received signal to remove noise outside the frequency band of the pseudorandom noise signal.

9. The processing method according to claim 7, further comprising the step of synchronizing the receiving device with the transmitting device by use of a pilot message that is not secret and is received by the receiving device from the transmitting device.

10. The processing method according to claim 7, wherein the decoding step is performed on a snapshot-by-snapshot basis and a validation check is performed on each snapshot resulting in a corrupt packet being dropped.

11. The processing method according to claim 7, further comprising the step of signal integration of the received signal to improve a signal-to-noise ratio of the received signal.

12. A wireless communication method comprising the steps of:

formatting a first parallel block of data bits of superimposed code of a predetermined length comprising at least one non-zero data bit;

generating a pseudorandom noise signal synthesized from a pseudorandom binary signal spanning a frequency band, wherein the frequency band is divided into a plurality of contiguous symbol bins equivalent to the predetermined length and each of the plurality of symbol bins comprises an information component and a zero padding component, whereby there is a zero padding component between each information component of the plurality of contiguous symbol bins;

encoding the information components of the plurality of symbol bins by setting a magnitude value and phase value for the at least one non-zero data bit, wherein the magnitude value conveys information and the phase value is assigned from a predetermined pseudo-random list of phase values that correspond to the plurality of contiguous symbol bins;

logically OR'ing the first parallel block of data bits with a pilot tone message that is not secret;

transmitting the pilot tone message with the encoded pseudorandom noise signal at different frequencies simultaneously, wherein the phase value does not convey information and is disregarded at a receiver that does not require prior knowledge of the phase value;

receiving the pilot tone message with the encoded pseudorandom noise signal at different frequencies simultaneously;

decoding the encoded pseudorandom noise signal by
- (i) analyzing each information component of the plurality of contiguous symbol bins by performing peak detection to determine whether a non-zero data bit is present, and
- (ii) zeroing each zero component; and formatting a second parallel block of data bits of superimposed code of the predetermined length comprising the at least one non-zero data bit corresponding to the information components of the plurality of contiguous symbol bins and checking to validate whether the second parallel block of data bits is a hallucination or not, and discarding the second parallel block of data bits if the hallucination check fails.

* * * * *